US005523762A

United States Patent [19]

Streetman

[11] Patent Number: 5,523,762

[45] Date of Patent: Jun. 4, 1996

[54] EMERGENCY AUTO DEVICE

[76] Inventor: James A. Streetman, 1275 Bennett Dr., Cumming, Ga. 30130

[21] Appl. No.: 377,181

[22] Filed: Jan. 24, 1995

[51] Int. Cl.⁶ .............................. H04B 7/185; G01S 5/02

[52] U.S. Cl. .............................. 342/357; 340/989

[58] Field of Search .............................. 342/357; 340/989, 340/990, 991, 992

[56] References Cited

U.S. PATENT DOCUMENTS

| | | |
|---|---|---|
| 5,119,102 | 6/1992 | Barnard . |
| 5,161,632 | 11/1992 | Asayama . |
| 5,223,844 | 6/1993 | Mansell et al. . |
| 5,225,842 | 7/1993 | Brown et al. . |
| 5,227,803 | 7/1993 | O'Connor et al. . |
| 5,257,195 | 10/1993 | Hirata . |
| 5,311,186 | 5/1994 | Utsu et al. . |
| 5,311,197 | 5/1994 | Sorden et al. . |

*Primary Examiner*—Theodore M. Blum
*Attorney, Agent, or Firm*—Chase & Yakimo

[57] ABSTRACT

A vehicle location system includes a transmitter with keyboard, the keyboard allowing a user to enter information corresponding to a street type, number and direction. Upon entry of such information, internal program logic circuitry forms a carrier signal for transmission to a displaced facility having an antenna therein. Upon receipt the signal is transformed into a user-readable form to allow assistance to be sent to the vehicle at the location corresponding to the entered information.

8 Claims, 4 Drawing Sheets

• Distressed Vehicle Location
8 Miles North of Interstate 70 and 21 Miles East of U.S. Highway 281

Codes Entered:
8 N 70 I 21 E 281 US <Send>

EMERGENCY AUTO DEVICE

BACKGROUND OF THE INVENTION

This invention relates to an emergency auto device and, more particularly, to a vehicle location system which utilizes a one-way radio signal to identify the particular location of a vehicle in a problem or emergency situation.

Upon a vehicle encountering an emergency or problematic situation, such as an auto accident, vehicle breakdown or the like, it is desirable to have means in the vehicle by which the driver can notify personnel that he/she is in an emergency situation. Although cellular telephones are available to allow the person to call for roadside assistance, such a telephone and accompanying services are not economical to purchase for emergency uses only.

Accordingly, it is desirable to provide a cost-effective device which allows a person to send a distress signal indicative of a vehicle in a problematic situation. Various patents have been issued which relate to the reporting of vehicle locations such as that shown in the Sorden U.S. Pat. No. 5,311,197 or Barnard U.S. Pat. No. 5,119,102. Although assumably effective in operation, these devices involve electronics and apparatus which will increase the cost of the devices.

In response thereto I provide a simple vehicle location system which utilizes available electronics so as to provide a cost-effective vehicle location system. My device basically comprises a transmitter for sending a one-way radio signal to a receiving tower. The signal contains user-generated information which corresponds to particular positional information indicative of the location of the distressed vehicle.

It is therefore a general object of this invention to provide a device for locating the position of a vehicle.

Another object of this invention to provide a device, as aforesaid, which allows the user to generate a signal containing positional information of the vehicle.

A further object of this invention is to provide a device, as aforesaid, which identifies the street type, number and direction of the vehicle.

Another object of this invention is to provide a device, as aforesaid, which presents a screen to the user to display the transmitted information.

Still another particular object of this invention is to provide a device, as aforesaid, which confirms the transmission of the positional information.

A further particular object of this invention is to provide a device, as aforesaid, which can be powered by a battery.

Still another object of this invention is to provide a device, as aforesaid, which is used in combination with road maps so as to provide the user information indicative of the vehicle's position.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
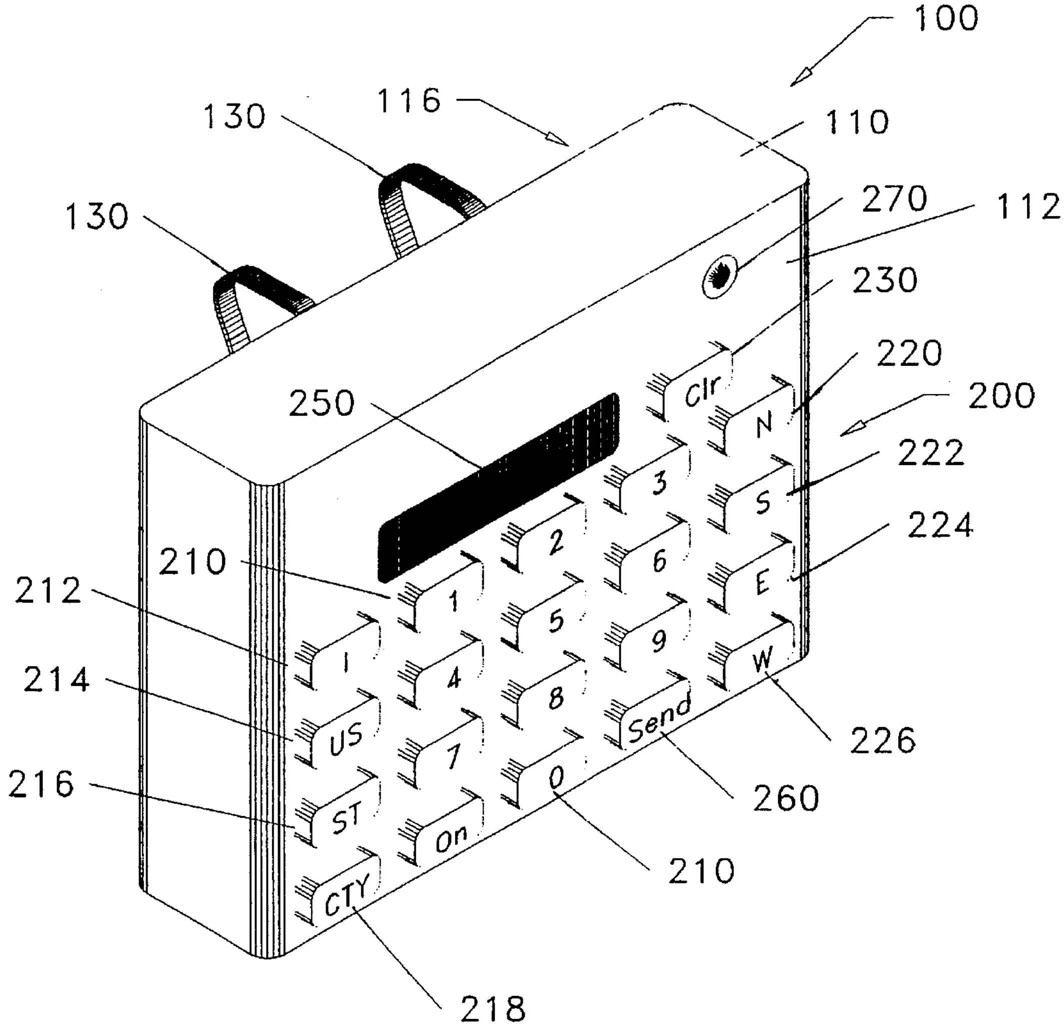
FIG. 1 is a front perspective view of the transmitter emergency auto device.
Figure 2:
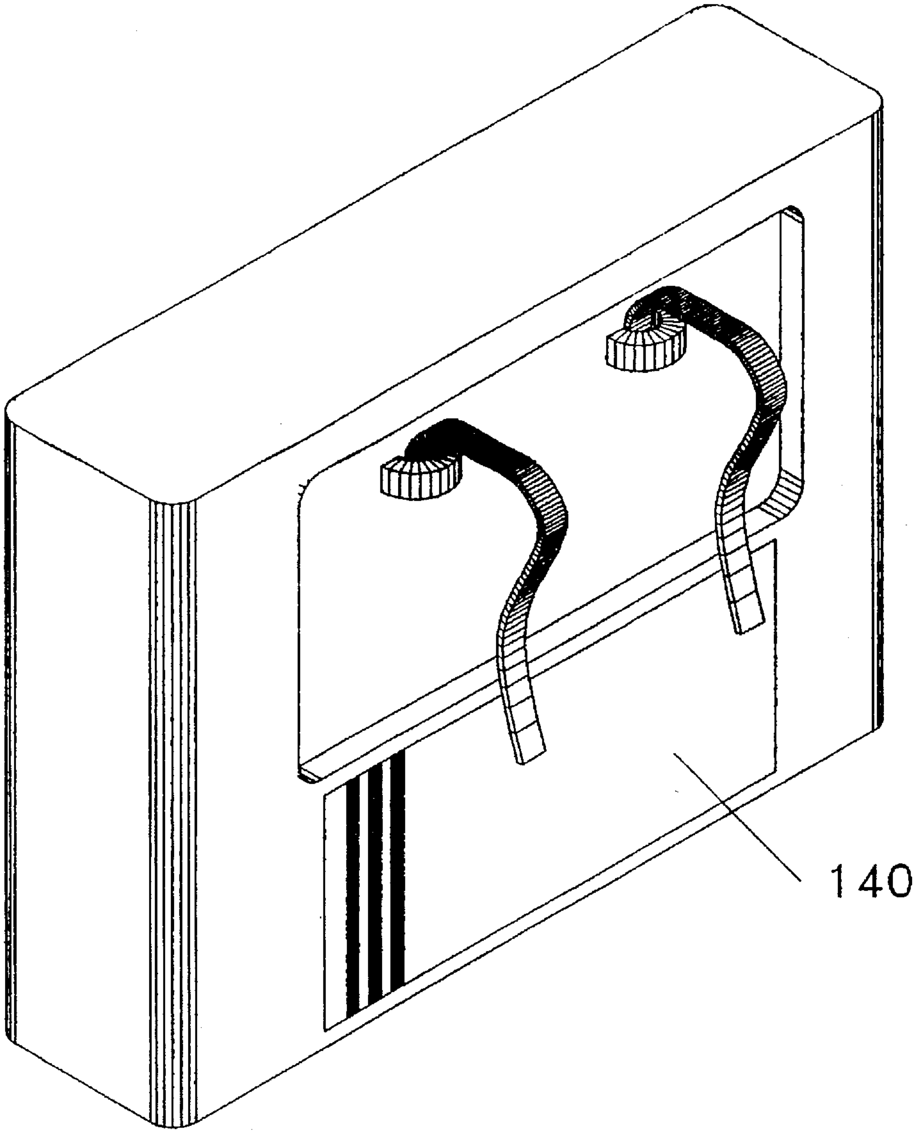
FIG. 2 is a rear view of the device in FIG. 1.
Figure 3:
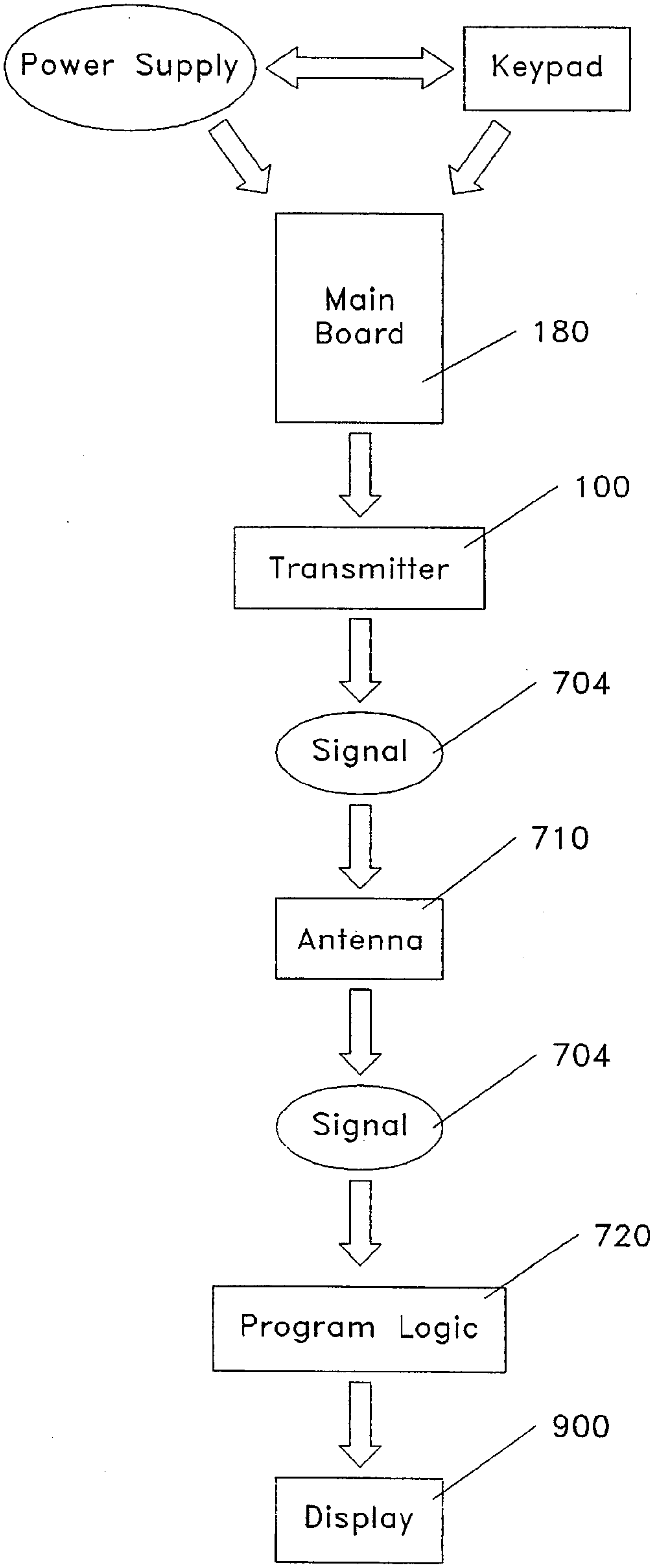
FIG. 3 is a general flow chart showing the operation of the system.

Turning more particularly to the drawings, FIG. 1 illustrates a transmitter 100 as comprising a housing 110 presenting a front panel 112 with a numeric key pad 200 thereon. On the back panel 116 are clips 130 for attachment of the transmitter 100 to a vehicle visor, user's belt or the like. A battery compartment 140 receives a 1.5 volt therein.

The key pad comprises a plurality of numerical buttons 210 (0–9) along with buttons corresponding to identification of an interstate highway "I" 212, U.S. highway "US" 214, State highway "ST" 216 and county road "CTY" 218. The cardinal directions are also indicated by the north "N" south "S" east "E" and west "W" buttons as designated by 220, 222, 224, 226. A clear "Clr" button 230 is also provided which allows the user to erase the entered information and restart the code.

The housing further presents an LCD screen 250 to allow the user to view the entered information before transmission of the same by depression of the "Send" button 260. Upon such transmission LED 270 will light.

Figure 4:
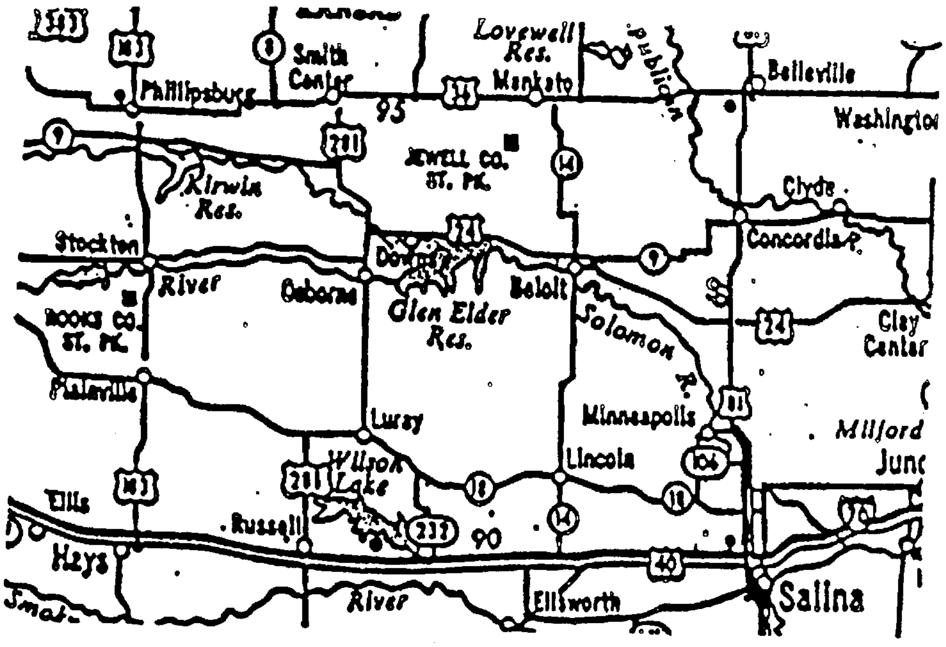
FIG. 4 is a diagrammatic view indicative of the accompanying atlas for use in the vehicle location system.

Located within the housing is a main circuit board 180 including the appropriate electronics to form a one-radio wave corresponding to information transmitted thereto by depression of the above key 260. Such board includes a PROM 190 chip therein, the chip containing program logic allowing the signals generated by depression of the various key pads to be formed into a carrier radio signal for subsequent transmission. It is understood that the logic program may restrict the user to entering only a proper format of information, the logic indicating to the user on screen 250 if a proper user-readable character string is not entered. One such format is as shown in FIG. 4. It is also understood that similar program logic will be at a displaced signal receiving facility so as to convert the signal into user-readable form.

Displaced from the vehicle, preferably at locations around the country, will be facilities 700 each having an antenna(s) 710 capable of receiving the signal 704 sent by in-range transmitters 100. The antenna(s) 710 will direct the radar signal to programmable logic 720 which will transform the received signal 704 into a user readable form. This signal 704 will identify the location of the vehicle containing transmitter 100 according to the street type, number and direction. Accordingly, the displaced facility operator upon receiving the readable information on a display screen 900, hard copy or other display may then take appropriate measures to render effective assistance to the vehicle.

In use, the vehicle occupant, facing a distress situation, will enter into the main circuit board 180 a location relative to the intersection of the nearest roads such as that shown in FIG. 4. Accordingly, the numerical distance, the cardinal direction "N", the type of highway "I" and highway number "70" is entered. Subsequently, a second relative location can also be entered, i.e. 21E281US, which is 21 miles east of US 281. The program logic will then form an appropriate signal carrying such information for transmission upon depression of the "Send" 260 button, such information being displayed on screen 250. The transmitted information, received in signal 704 form by antenna 710 is transformed into a user-readable form at the receiver facility 700 by logic 720 for use by the facility operator.

It is understood that the above has been described in relation to the skill of the art and will enable one so skilled to make and use the invention disclosed therein, it being understood that the form of components of the main circuit board 180, the program logic 720 and format may take various forms so as to achieve the desired vehicle location.

It is also to be understood that while a certain form of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A system for designating a vehicle location comprising:

an on-board vehicle transmitter including means therein for forming a radio signal comprising:

means for manually designating by a vehicle occupant a type of road relative to a position at which the vehicle is located;

means for manually designating by a vehicle occupant a numerical designation of the road relative to the position at which the vehicle is located;

means for manually designating by a vehicle's occupant the mileage of the vehicle's position from the designated road;

means for manually designating by a vehicle occupant a cardinal direction of the vehicle's position relative to the designated road;

means for confirming that said road type, road number, mileage and cardinal direction location has been correctly designated by the vehicle occupant;

said transmitter further comprising:

means for sending by the vehicle occupant said signal;

means for displaying to the vehicle occupant the information entered into said transmitter in a user readable form;

an antenna displaced from the vehicle for receiving said transmitted signal;

means for transforming the signal received by said antenna to a user readable form indicative of the location of the vehicle according to road type, number, mileage and direction.

2. The system as claimed in claim 1 wherein said road type designating means comprises a keyboard having at least one key corresponding to an entry of characters indicative of a road type of a plurality of road types.

3. The system as claimed in claim 1 wherein said road number designating means comprises a keyboard having numerical keys for entry of characters indicative of said road number.

4. The system as claimed in claim 1 wherein said cardinal direction designating means comprises a keyboard having keys for entry of characters indicative of said cardinal directions.

5. The system as claimed in claim 1 wherein said forming means comprises logic circuitry for receiving a signal from said designating means and forming said signals into said radio signal.

6. The system as claimed in claim 1 wherein said display means comprises an LED screen.

7. The system as claimed in claim 1 wherein said confirming means comprises logic circuitry for comparing said location to a preselected format.

8. A system for designating a vehicle location comprising:

an on-board vehicle transmitter including means therein for forming a radio signal comprising:

means for manually designating by a vehicle occupant a type of road relative to a position at which the vehicle is located;

means for manually designating by a vehicle occupant a numerical designation of the road relative to the position at which the vehicle is located;

means for manually designating by a vehicle's occupant the mileage of the vehicle's position from the designated road;

means for manually designating by a vehicle occupant a cardinal direction of the vehicle's position relative to the designated road;

said transmitter further comprising:

means for sending by the vehicle occupant said signal;

means for displaying to the vehicle occupant the information entered into said transmitter in a user readable form;

an antenna displaced from the vehicle for receiving said transmitted signal;

means for transforming the signal received by said antenna to a user readable form indicative of the location of the vehicle according to road type, number, mileage and direction.

* * * * *